US009026899B2

(12) United States Patent
Geithner

(10) Patent No.: US 9,026,899 B2
(45) Date of Patent: May 5, 2015

(54) USER INTERFACE INCLUDING FIELD EXPLORER LISTING AVAILABLE FIELDS FOR POPULATION

(75) Inventor: Ralf Wolfgang Geithner, Schwetzingen (DE)

(73) Assignee: SAP SE, Walldorf (DE)

( * ) Notice: Subject to any disclaimer, the term of this patent is extended or adjusted under 35 U.S.C. 154(b) by 390 days.

(21) Appl. No.: 13/548,733

(22) Filed: Jul. 13, 2012

(65) Prior Publication Data

US 2014/0019840 A1 Jan. 16, 2014

(51) Int. Cl.
*G06F 17/24* (2006.01)
*G06F 3/048* (2013.01)

(52) U.S. Cl.
CPC .................................... *G06F 17/243* (2013.01)

(58) Field of Classification Search
CPC ............ G06F 17/243; G06F 17/30398; G06F 17/30893; G06F 17/27; G06F 3/0486
See application file for complete search history.

(56) References Cited

U.S. PATENT DOCUMENTS 7,480,867 B1 * 1/2009 Racine et al. ................. 715/744
2004/0030991 A1 * 2/2004 Hepworth et al. ............ 715/507
2005/0149854 A1 * 7/2005 Pennell et al. ................ 715/507
2008/0276194 A1 11/2008 Dykstra-Erickson
2010/0162159 A1 * 6/2010 Sudhi ............................ 715/780
2011/0197119 A1 * 8/2011 Ye et al. ........................ 715/226
2012/0054593 A1 * 3/2012 Naderi .......................... 715/224

FOREIGN PATENT DOCUMENTS

EP 1887478 A1 2/2008
EP 2224348 A1 9/2010

OTHER PUBLICATIONS

European Search Report dated Oct. 1, 2013 from European Patent Application No. EP 13 17 6477.

* cited by examiner

*Primary Examiner* — Kavita Padmanabhan
*Assistant Examiner* — Ariel Mercado
(74) *Attorney, Agent, or Firm* — Fountainhead Law Group PC

(57) ABSTRACT

A user interface features a field explorer component comprising a list of available fields in a stored document. Certain embodiments may present the field explorer in conjunction with an existing transaction interface. In one operational mode, information may be input by selecting values from a drop menu associated with one field of the field explorer. The corresponding field of the transaction interface may be indicated (e.g. with highlighting), with the user being allowed to click/drag/drop selected data from the field explorer to that indicated field. Some embodiments may dispense with displaying the transaction interface, presenting the field explorer instead alongside a symbolic representation of a document container. In this operational mode, the user pulls the desired data from the field explorer into the container representation. If the document is persisted (e.g. as a file or on a database), an output representation (e.g. PDF) may be generated and stored.

17 Claims, 17 Drawing Sheets

USER INTERFACE INCLUDING FIELD EXPLORER LISTING AVAILABLE FIELDS FOR POPULATION

BACKGROUND

Embodiments of the present invention relate to user interfaces, and in particular, to an interface comprising a list of available input fields for user entry.

Unless otherwise indicated herein, the approaches described in this section are not prior art to the claims in this application and are not admitted to be prior art by inclusion in this section.

Many conventional software programs, e.g. as are employed for various transactions, may be difficult to use without extensive training. This may be due to their complexity, with some transactions/programs calling for users to enter data into as many as hundreds of input fields, some of which are mandatory and some of which are not mandatory.

Corresponding user interfaces may accordingly exhibit significant visual complexity, in their attempt to mimic the look and feel of paper documents. An untrained user can thus easily become lost in attempting to fill out the various fields, not knowing which ones are mandatory, and/or if certain fields are located on a sub-screen accessed via a tab or some other hidden user interface (UI) element (e.g. a non-deployed toolbar, or a folder tab that has not been clicked on).

The present disclosure addresses these and other issues with a user interface including a field explorer component displaying available input fields as a list.

SUMMARY

A user interface features a field explorer component comprising a list of available fields in a stored document. Certain embodiments may present the field explorer in conjunction with an existing transaction interface. In one operational mode, information may be input by selecting values from a drop menu associated with one field of the field explorer. The corresponding field of the transaction interface may be indicated (e.g. with highlighting), with the user being allowed to click, drag, and drop selected data from the field explorer to that indicated field. Some embodiments may dispense with displaying the transaction interface, presenting the field explorer instead alongside a symbolic representation of a document container. In this operational mode, the user pulls the desired data from the field explorer into the container representation. If the document is persisted (e.g. as a file or on a database), an output representation (e.g. PDF) may be generated and stored.

An embodiment of a computer-implemented method comprises providing an interface engine in communication with a stored document comprising a plurality of available input fields, and causing the interface engine to display a list of the plurality of available input fields. In response to a first input, the interface engine is caused to display possible values for a first available input field. In response to a second input, the interface engine is caused to enter a value for the first available input field into the stored document.

An embodiment of a non-transitory computer readable storage medium embodies a computer program for performing a method comprising, providing an interface engine in communication with a stored document comprising a plurality of available input fields, and causing the interface engine to display a list of the plurality of available input fields. In response to a first input, the interface engine is caused to display possible values for a first available input field. In response to a second input, the interface engine is caused to enter a value for the first available input field into the stored document.

An embodiment of a computer system comprises one or more processors and a software program executable on said computer system. The software program is configured to provide an interface engine in communication with a stored document comprising a plurality of available input fields. The software program is configured to cause the interface engine to display a list of the plurality of available input fields. In response to a first input, the interface engine is caused to display possible values for a first available input field. In response to a second input, the interface engine is caused to enter a value for the first available input field into the stored document.

In certain embodiments the interface engine displays a required input field of the list in a manner different from an optional input field.

According to some embodiments the interface engine is configured to display with the list, a transaction user interface to the stored document, and the second input comprises dragging the value to the transaction user interface.

In various embodiments the user interface is configured to display with the list, a symbolic representation of the stored document, and the second input comprises dragging the value to the symbolic representation.

Particular embodiments further comprise causing the interface engine to move the first available input field to an end of the list after the value has been entered into the stored document.

In some embodiments the stored document comprises a database including a table, and the list comprises columns of the table.

According to various embodiments the interface engine is caused to display the list from a generic input field.

The following detailed description and accompanying drawings provide a better understanding of the nature and advantages of particular embodiments.

DETAILED DESCRIPTION

Described herein are techniques for providing an interface for a user. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
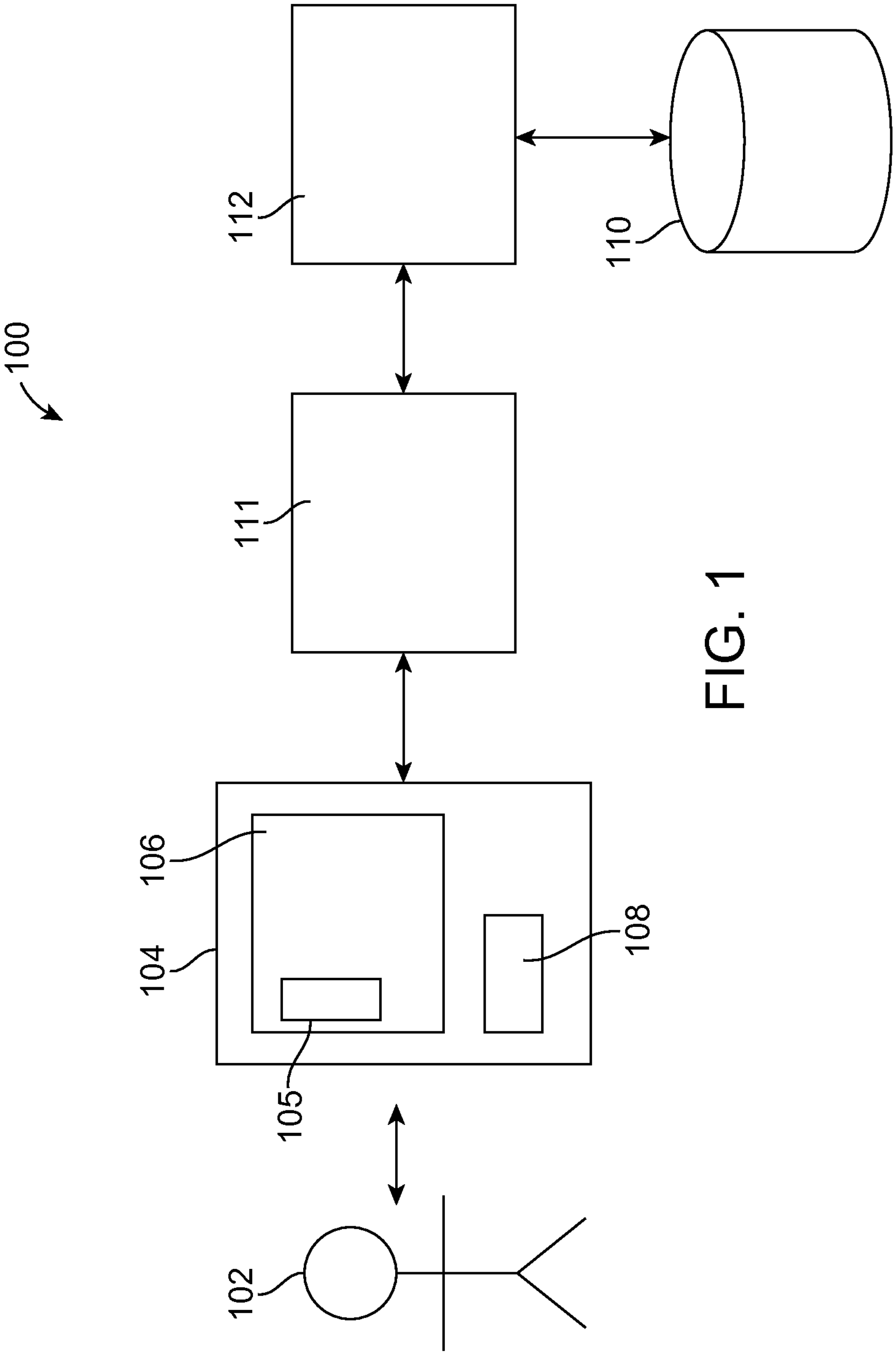
FIG. 1 shows a simplified view of a system for providing a user interface according to an embodiment.

FIG. 1 shows a simplified view of a system 100 for providing a user interface according to an embodiment. In particular, a user 102 is equipped with a device 104 (which may be a mobile device such as a smart phone) comprising a display 106 and an input mechanism 108. Examples of such input mechanisms include but are not limited to a touch screen, a mouse, a keypad, or a keyboard.

The user seeks to use the device to access information stored in data warehouse 110 such as a database (DB), via an interface 111. Accordingly a processor comprising an interface engine 112 is configured to provide a field explorer 105 as part of the interface, to receive inputs from the user, and in turn to communicate information to the data warehouse 110. In response to receipt of that information, the data warehouse returns the requested data to the interface engine, which in turn communicates it to the user via the interface.

Figure 1A:
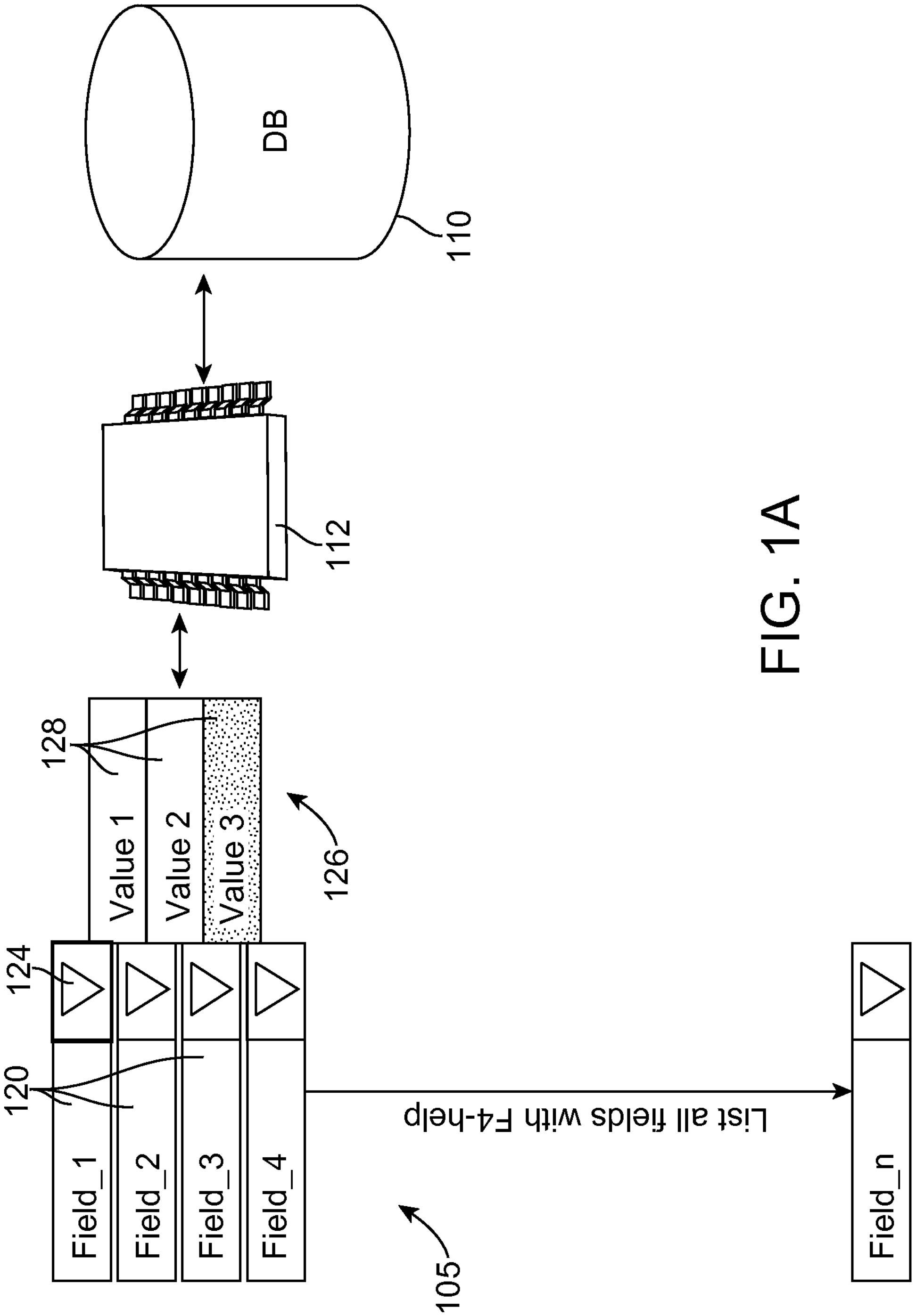
FIG. 1A shows an embodiment of a field explorer.

FIG. 1A is a view showing details of an embodiment of a field explorer 105 that is generated and maintained by the interface engine 112 for interaction with a database 110. In particular, the field explorer comprises a listing of different fields 120 that are available for selection and input to a document stored in the database.

In this figure the term "F4-help" refers to input helps to an input field, that provide (dropdown) lists of pre-configured, allowed values where a user can choose from. An example could be a choice of available countries from a dropdown list in an address form.

Upon selection of a particular input field by a user of the field explorer, a value for that input field may be entered. In particular, FIG. 1A shows an icon 124 that may trigger a drop down menu 126 listing particular values 128 for a field (Field_1) of the field explorer.

As mentioned above, according to certain embodiments input fields that are required to be completed in a document, may be differentiated from other input fields. This may be accomplished, for example, by the use of font type, font size, and/or color (e.g. font, background), or similar indicators.

Figure 1B:
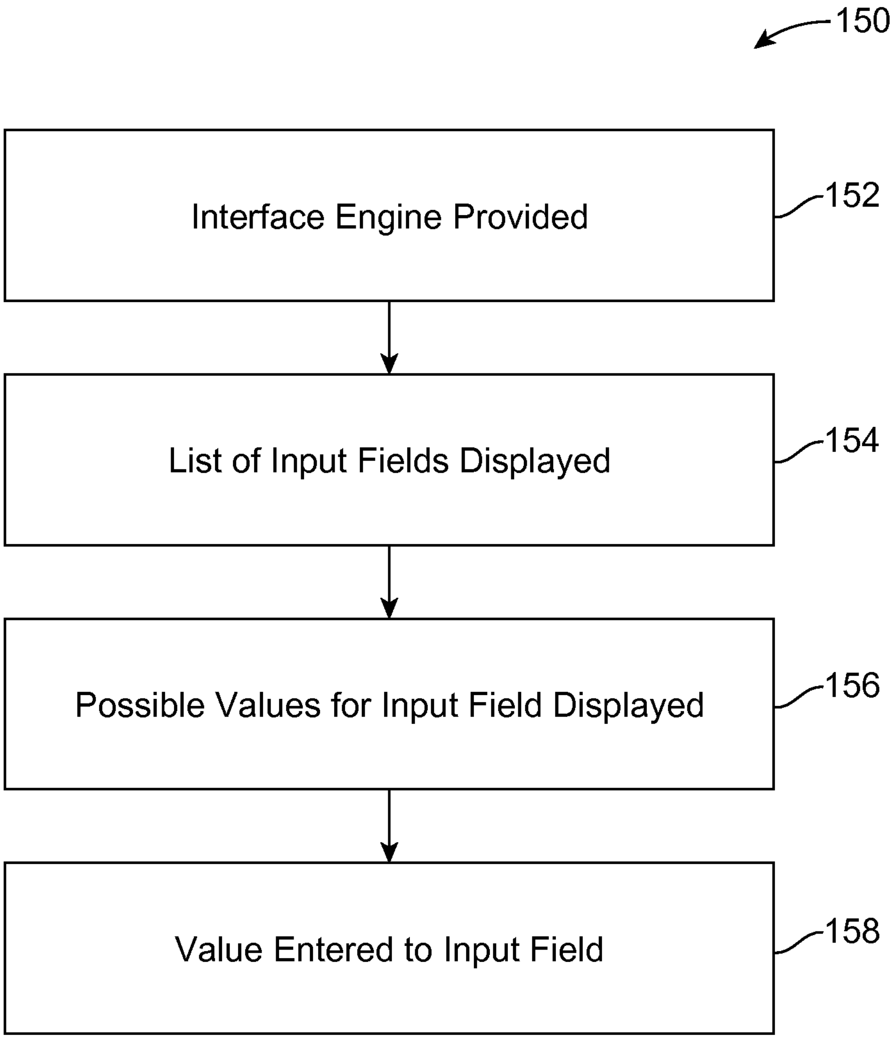
FIG. 1B is a simplified flow diagram showing a method according to an embodiment.

FIG. 1B is a simplified flow diagram showing an embodiment of a method 150. In a first step 152, an interface engine is provided in communication with a stored document comprising a plurality of available input fields. In a second step 154, the interface engine is caused to display a list of the plurality of available input fields. In a third step 156 the interface engine is caused to display possible values for a first available input field, in response to a first input. In a fourth step 158, the interface engine is caused to enter a value for the first available input field into the stored document, in response to a second input.

EXAMPLE

Overlay Mode

Figure 2A:
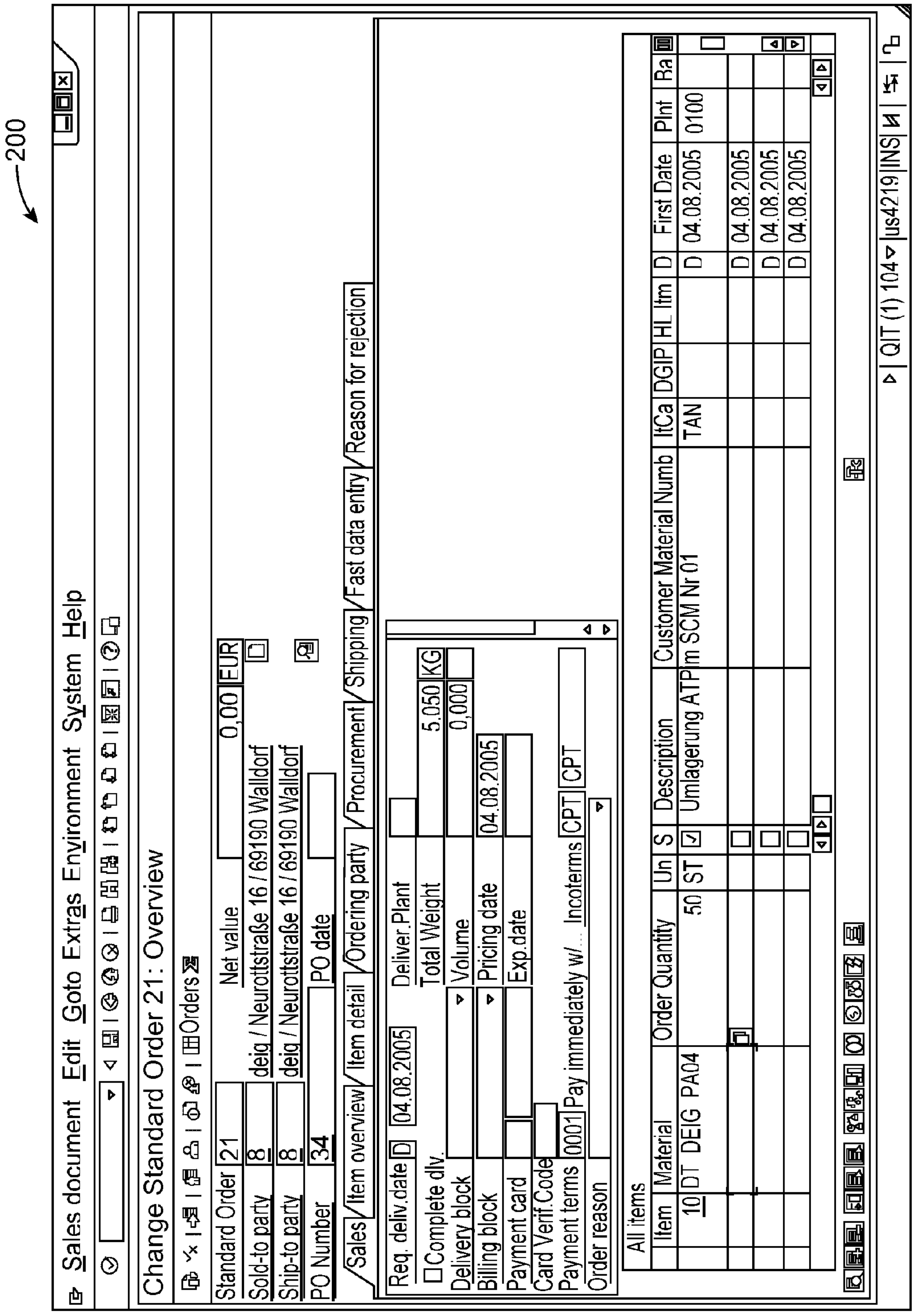
FIGS. 2A-F are screen shots showing one example of a user interface according to an embodiment.
Figure 2B:
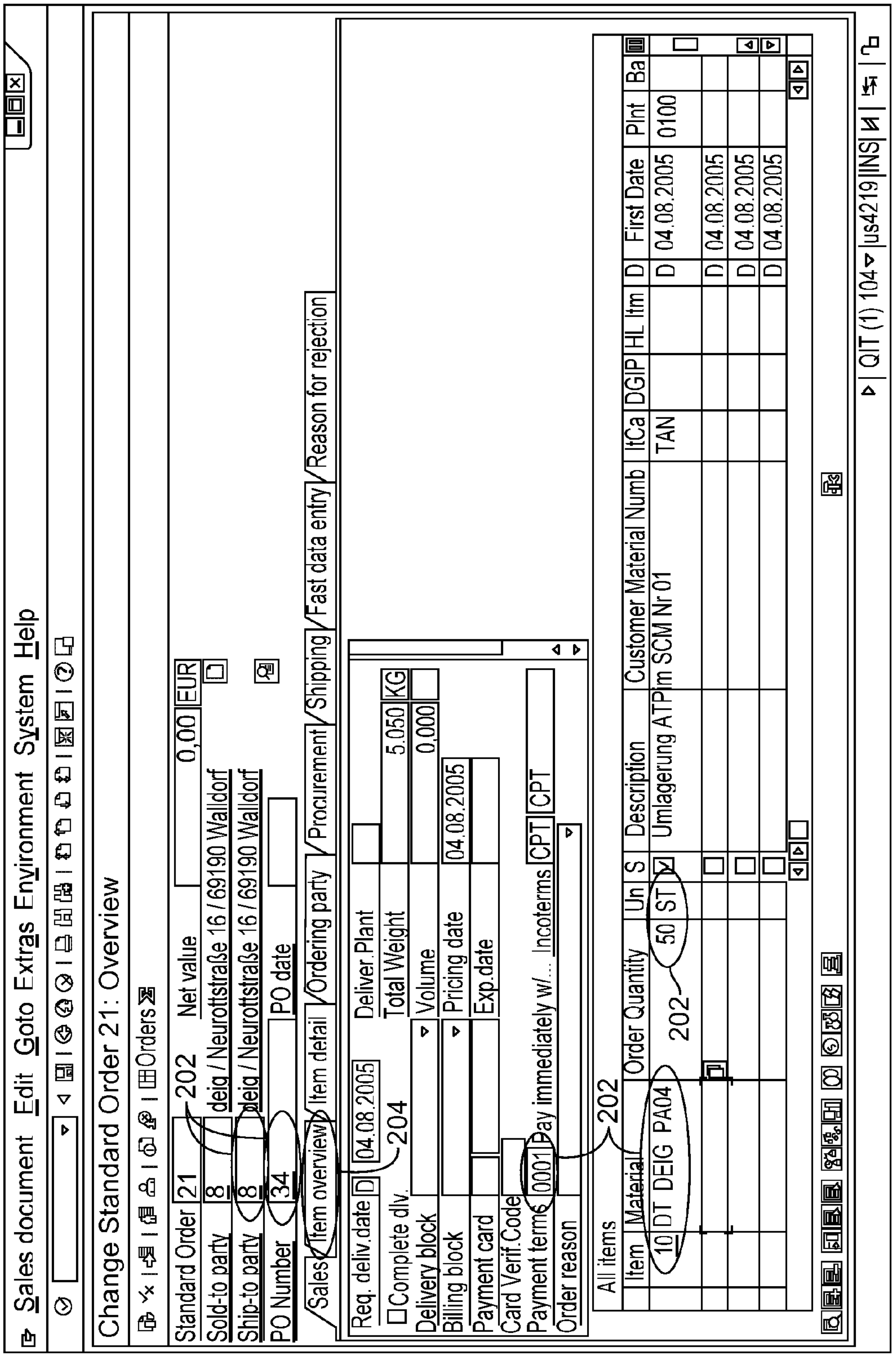

FIGS. 2A-F are screen shots showing an example of a user interface according to an embodiment utilizing an "overlay" operational mode. Specifically, FIG. 2A shows a transaction user interface (UI) 200, here comprising overview screen to change an order form (Standard Order 21). As indicated in FIG. 2B, this transaction UI features a plurality of input fields 202 configured to receive information for entry by a user.

Only some of those input fields are visible utilizing a particular access tab 204 (here the "Item overview" tab). Other available input fields may not be visible (e.g. an "item detail" such as input field for a lot number of material), ordinarily requiring the user to manipulate the interface to access another tab.

Figure 2C:
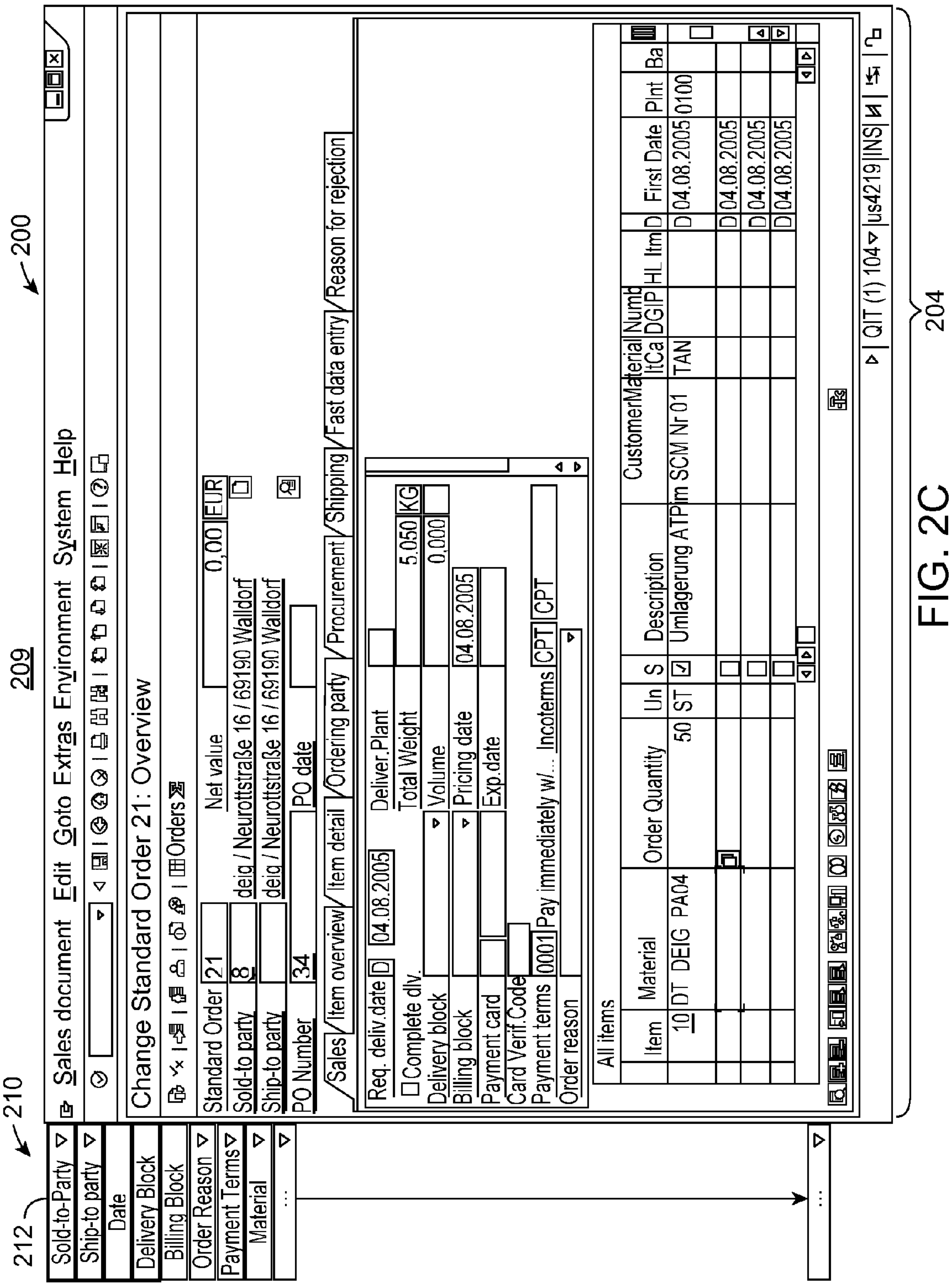

However, FIG. 2C shows a screen shot of a user interface 209 featuring a field explorer according to an embodiment, wherein a list of available input fields is presented to the user. In the "Overlay" mode of operation depicted in this example, as shown in FIG. 2C the interface further comprises a field explorer 210 that is positioned alongside the existing transaction user interface (UI) 200.

Figure 2D:
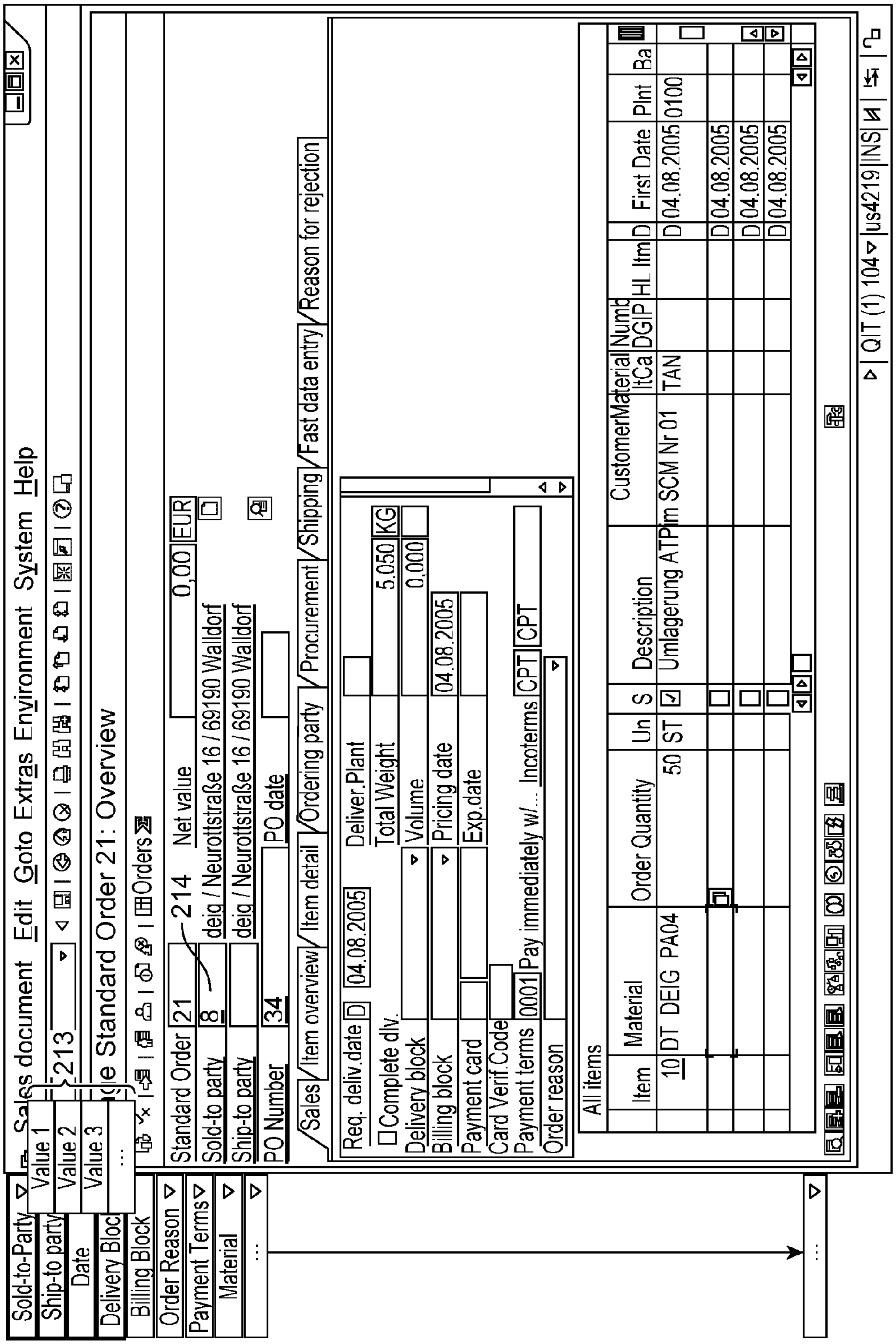
Figure 2E:
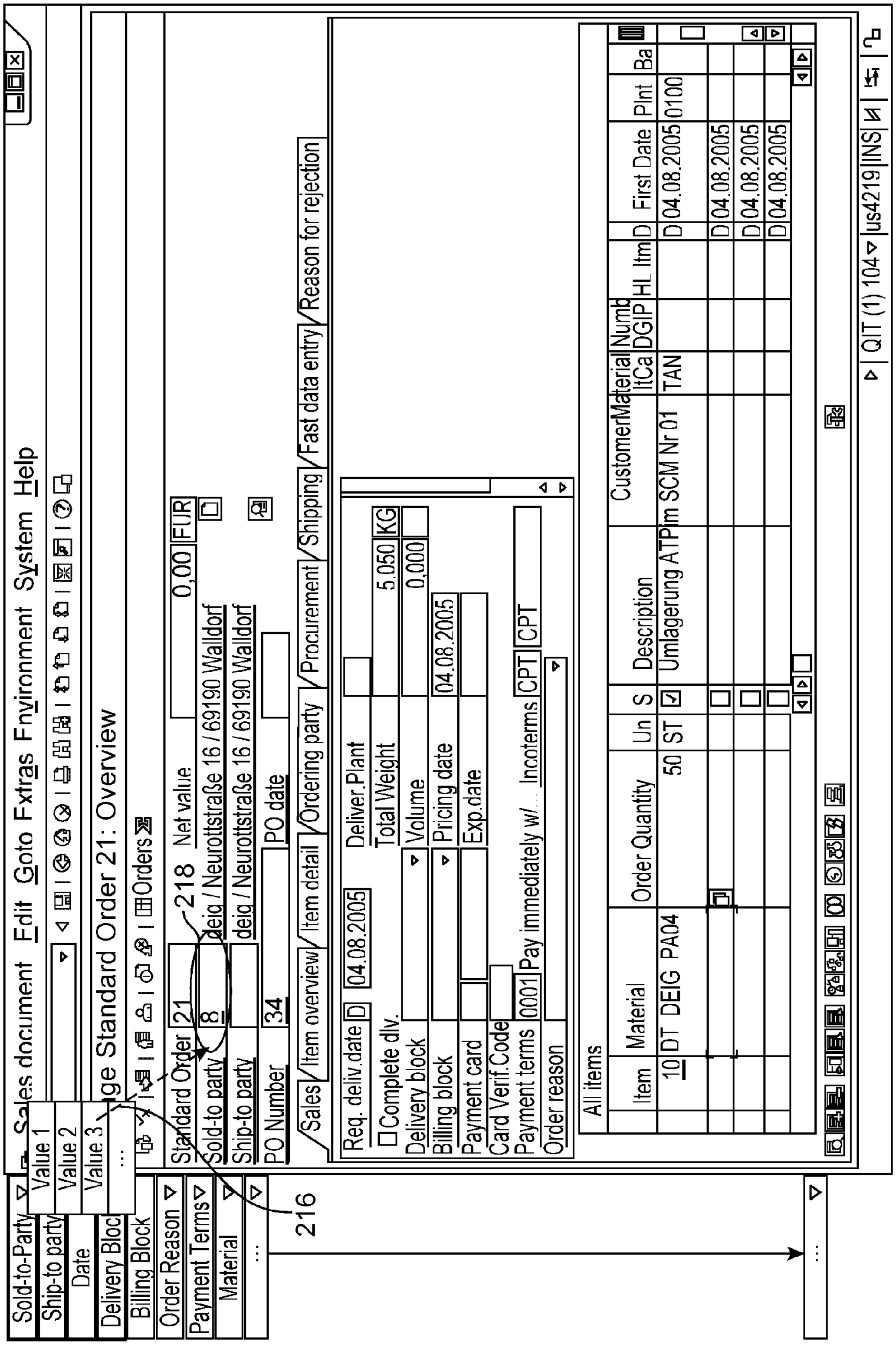

In the specific screen shot of FIG. 2C, the transaction UI is deactivated as represented to the user through the use of an overlying gray mask 204. As shown in FIG. 2D, the user can now click on a particular field 212 in the field explorer 210, and a list 213 of possible values (F4-help) appears on the screen (e.g. drop down list).

As shown in FIG. 2D, once the user clicks on the field 212 in the field explorer, the corresponding field on the transaction UI may be delineated to the user, e.g. by providing a corresponding opening 214 in the gray mask. As further shown in FIG. 2E, the user may then click upon a value of a field in the field explorer, drag 216 that value (e.g. with a mouse or touchpad) to the inactivated transaction UI, and drop 218 that value into the highlighted corresponding field of the transaction UI.

If the spatial relation between the field of the field explorer and the corresponding field of the transaction UI is 1:1, there may be no need for the user to aim for the correct field to drag and drop the value. Instead, the user may simply drop the value somewhere within the transaction UI area. If the spatial relation between the field of the field explorer and the corresponding field of the transaction UI is other than 1:1 (e.g. 1:n), then the user may need to indicate the correct field by dragging and dropping the value nearby.

According to some embodiments, the act of filling a field may be indicated by changing the color of the text, field background, and/or field border in order to indicate a "completed" state.

Figure 2F:
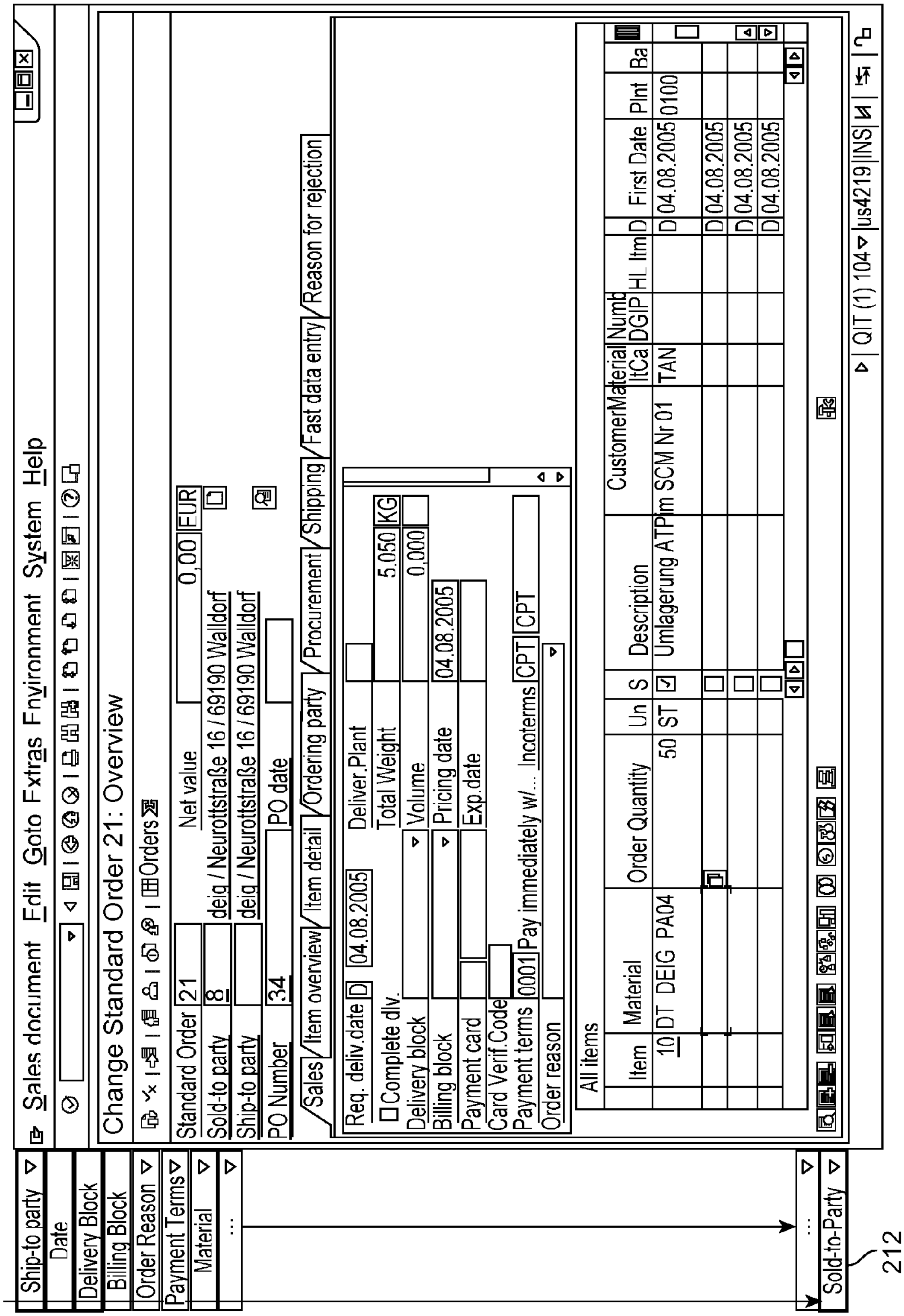

Moreover in certain embodiments the location within the field explorer of a field having data entered thereto by a user, may be changed. For example FIG. 2F shows that entry of data to the field 212, has resulted in its relocation to the end (bottom) of the field list, with only non-filled fields remaining at the top of the list of the field explorer.

Field Explorer Based Transaction

Figure 3:
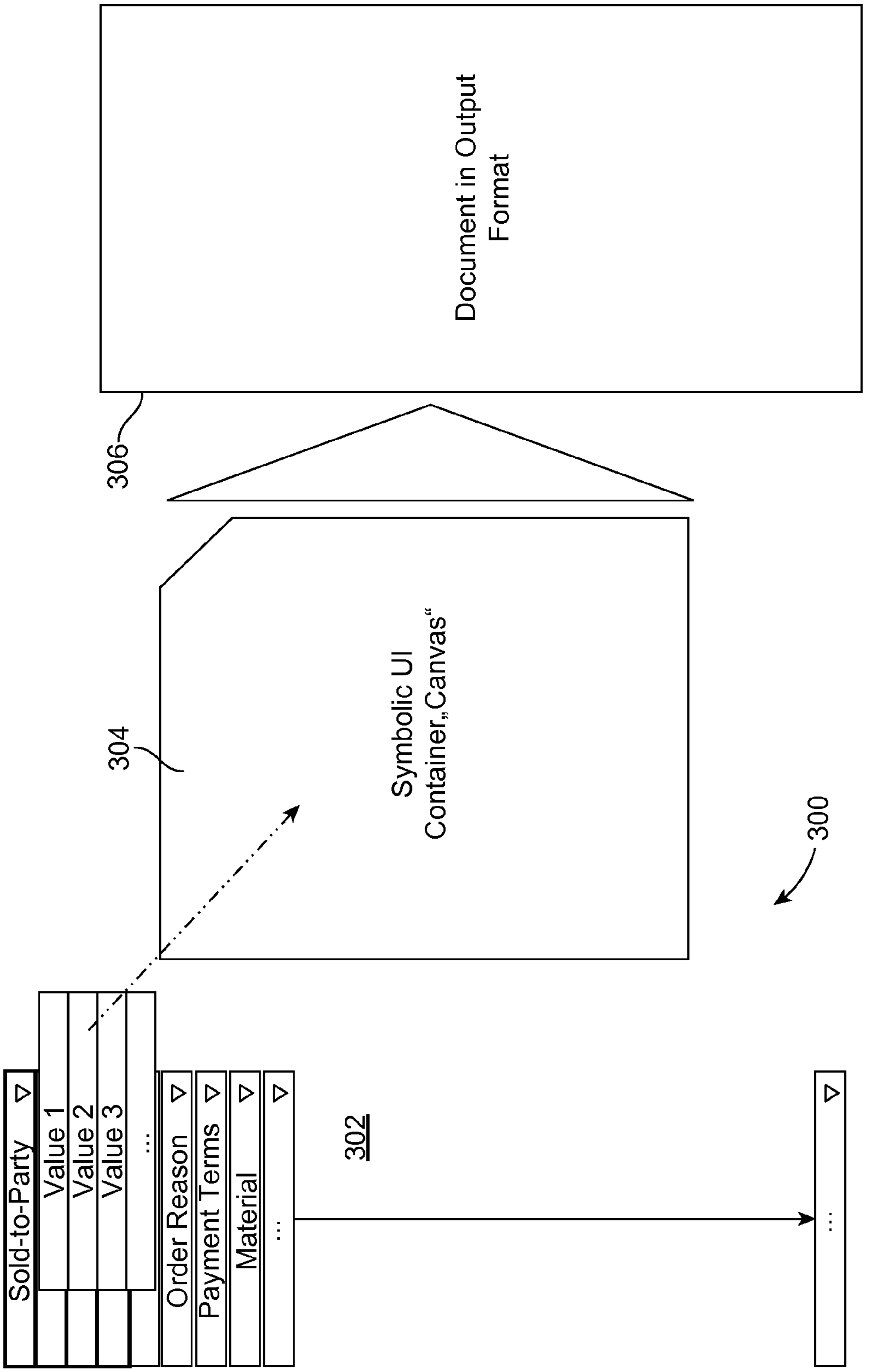
FIGS. 3-3E are schematic diagrams showing another example of a user interface according to an alternative embodiment.
Figure 3A:
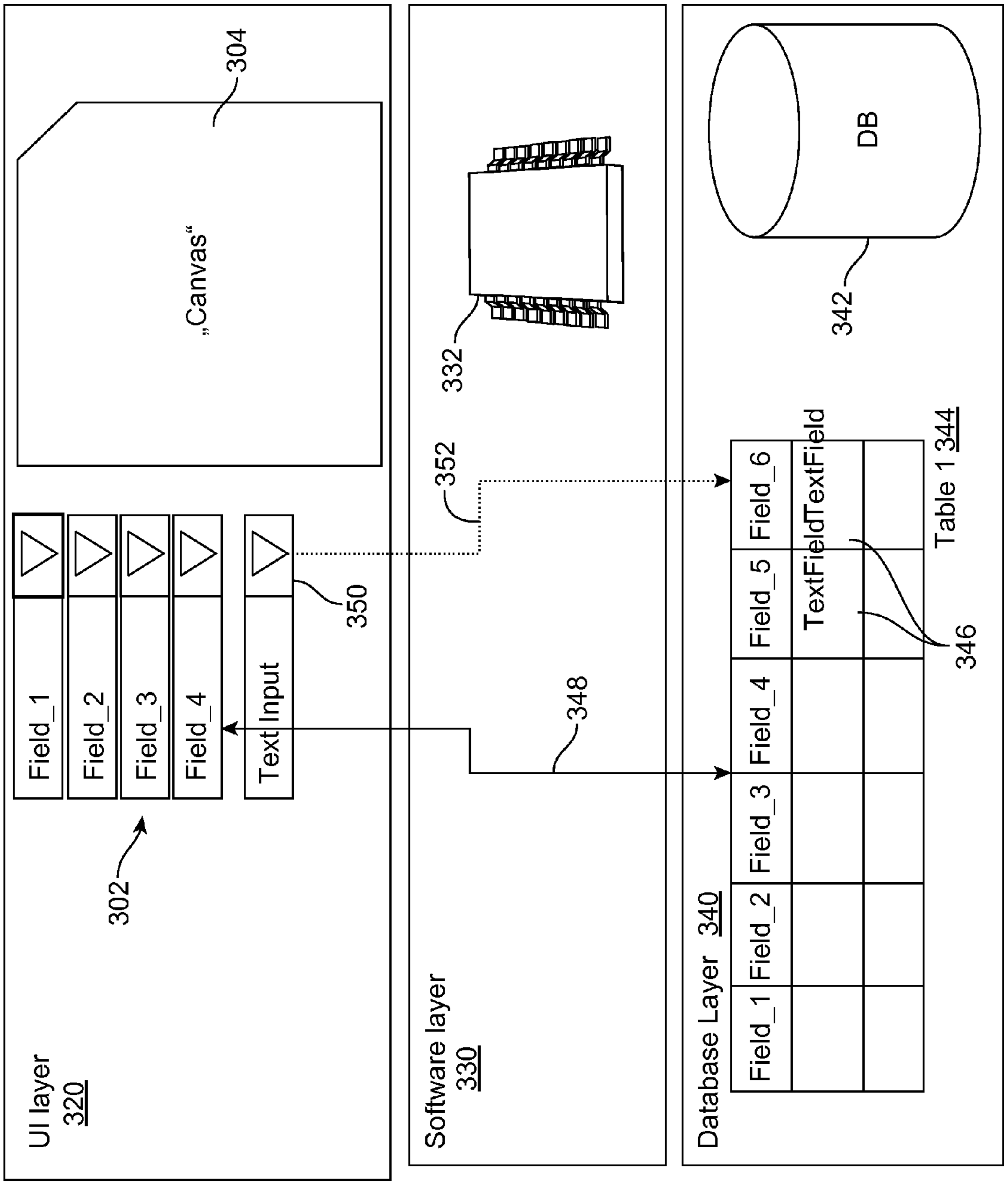
Figure 3B:
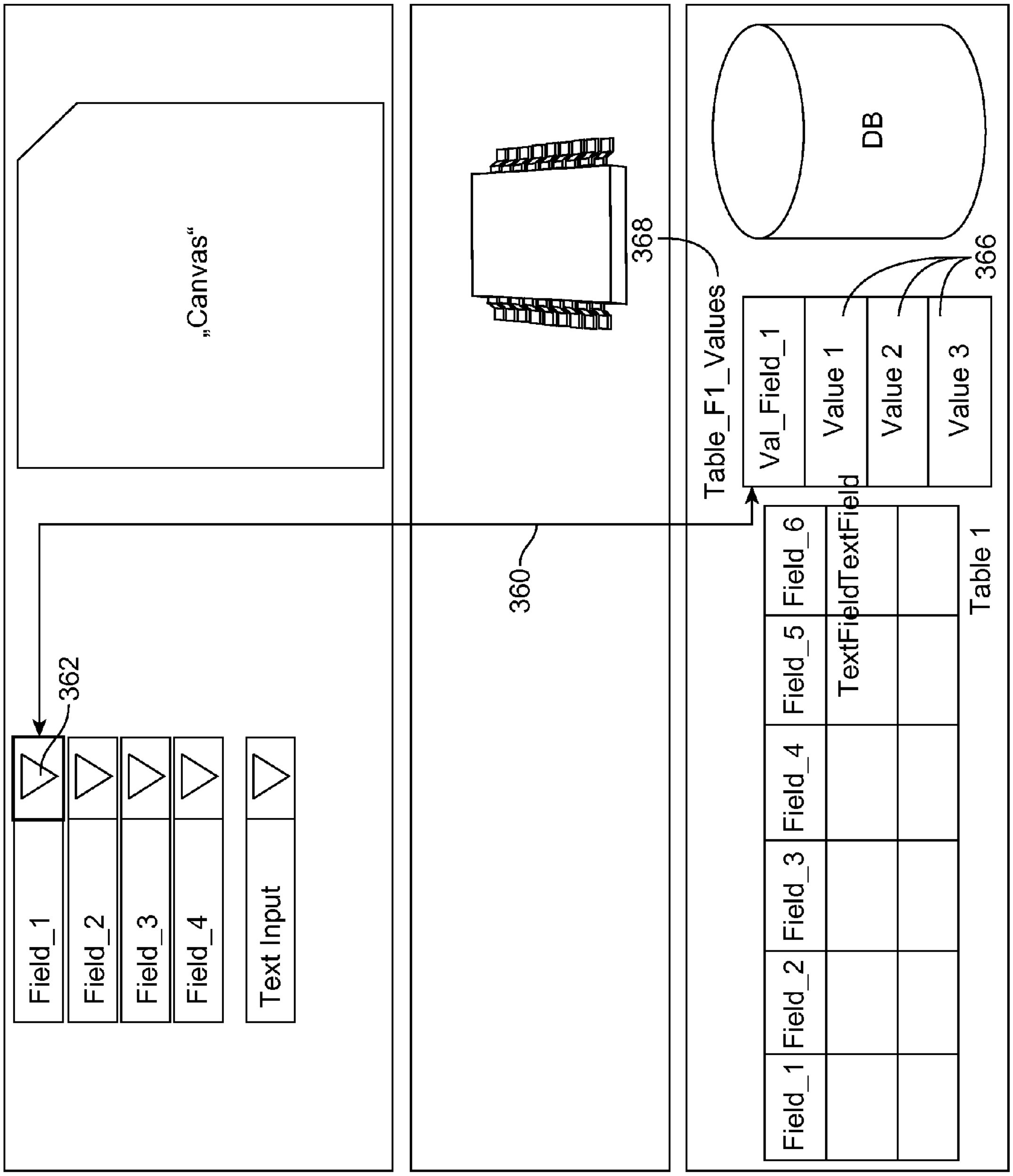
Figure 3C:
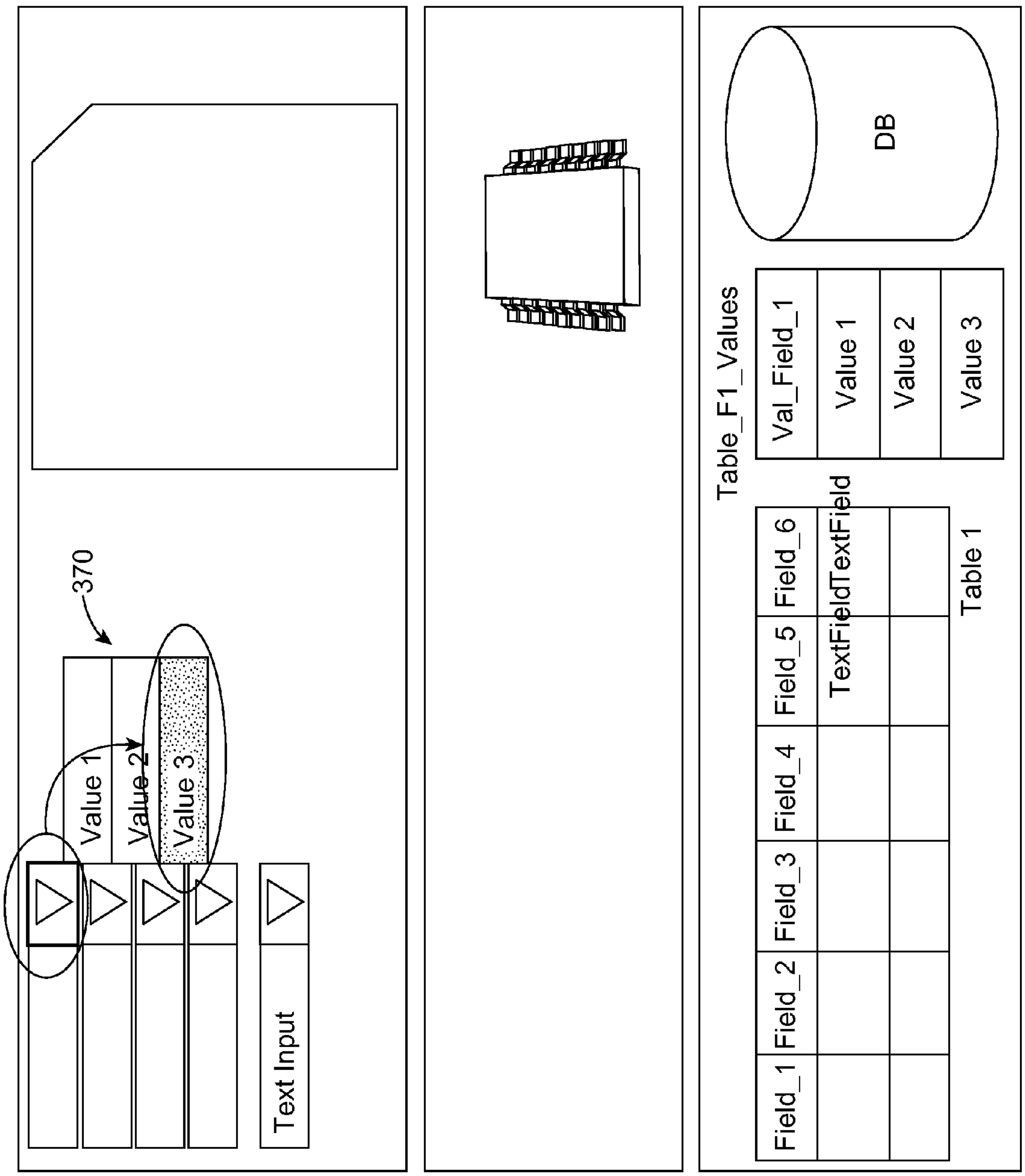
Figure 3D:
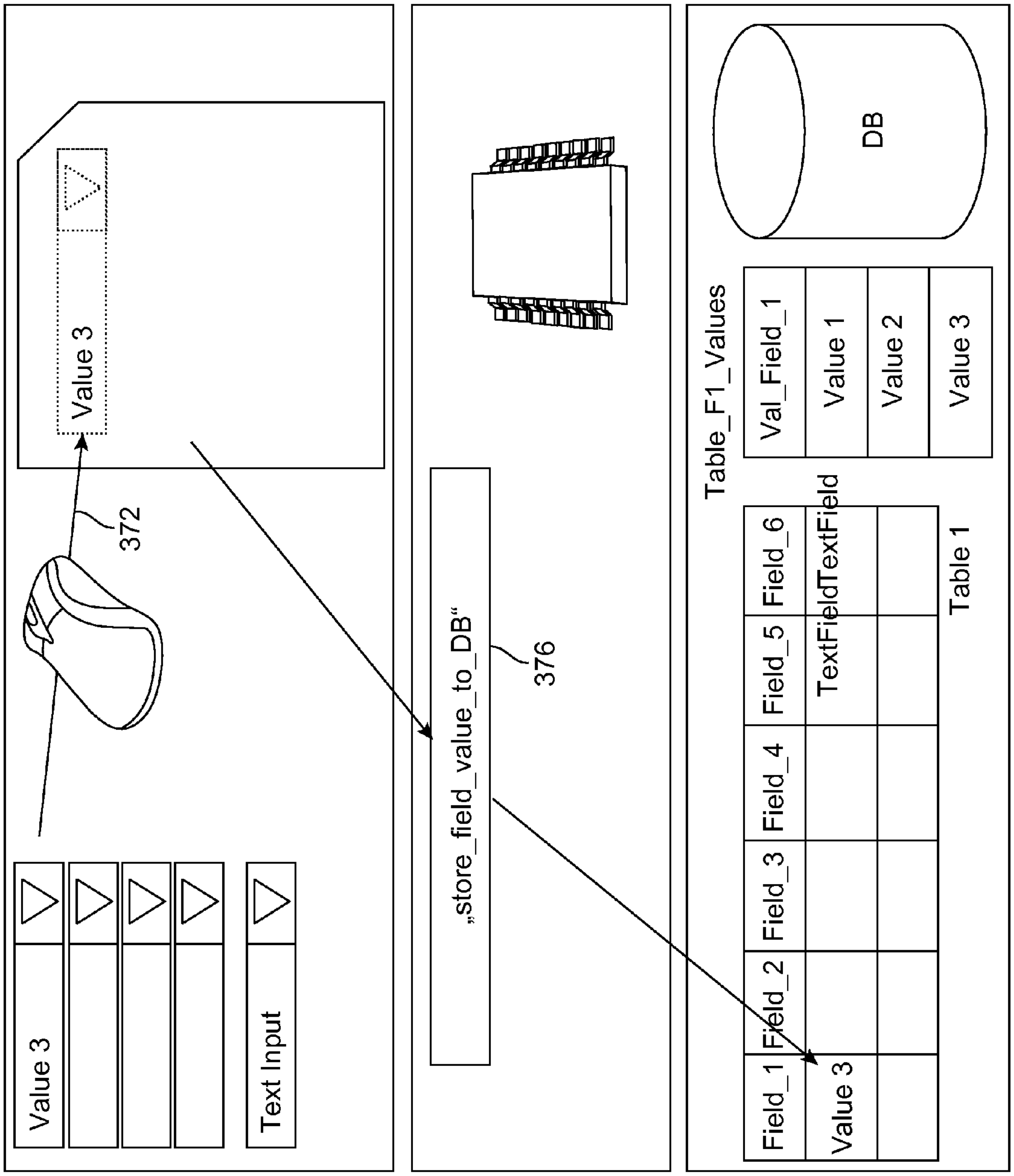
Figure 3E:
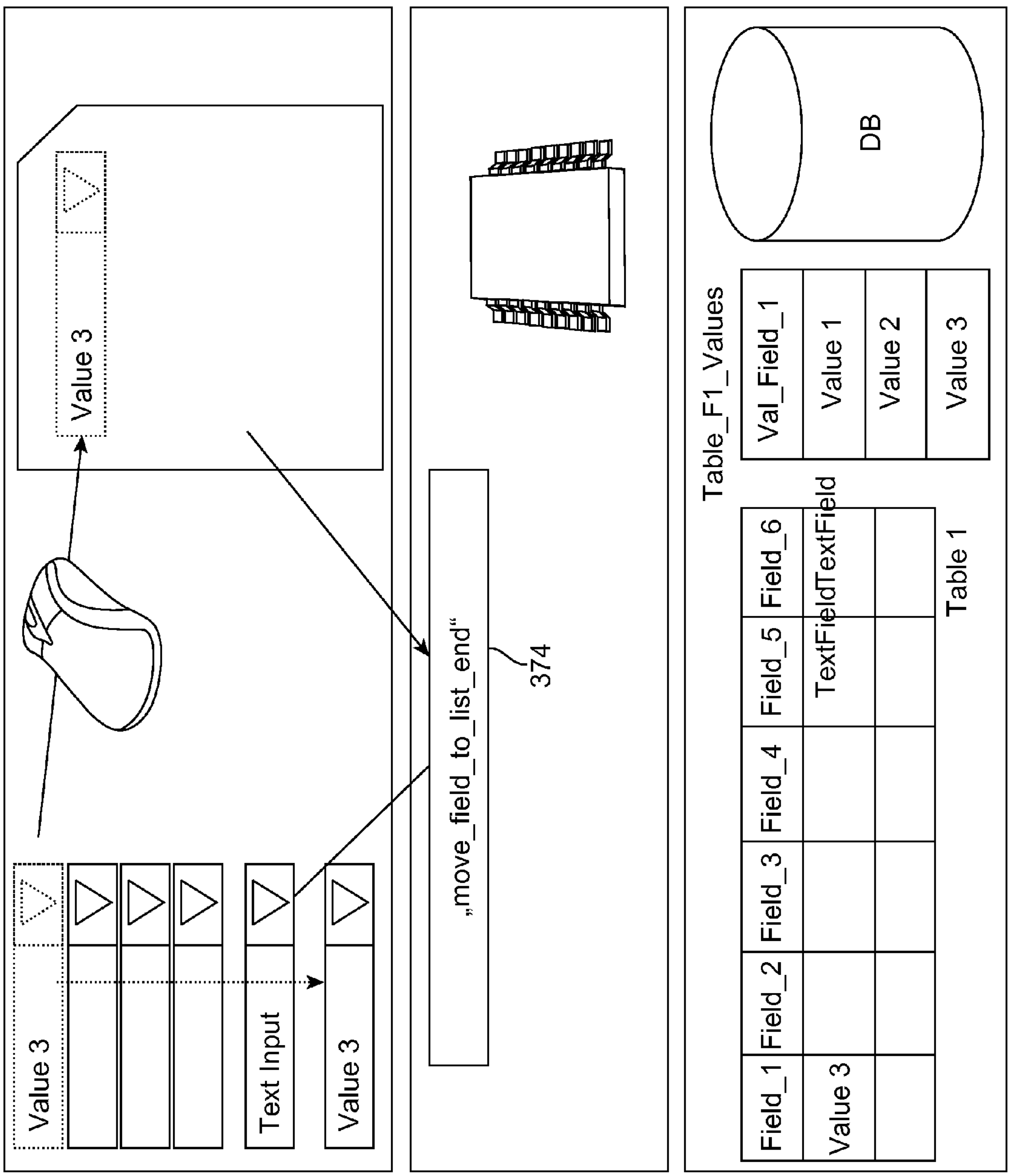

FIGS. 3-3E illustrate various aspects of another example of a mode of operation of a user interface according to an embodiment. Specifically, as shown in FIG. 3, in this example the interface 300 comprises only the field explorer 302 together with a symbolic UI representation 304 of a document container (also referred to hereafter as a "canvas").

While FIG. 3 shows a particular embodiment of an interface comprising a field explorer in conjunction with a canvas, this is not absolutely required. For example, an interface could comprise only a single input field, with the user simply providing input to the field through the use of free text entry.

However, where there are more than one text input field (as in the embodiment of FIG. 3), the UI may comprise the canvas and the field explorer. FIG. 3A is a schematic view showing the environment for the interface example of FIG. 3. In particular, the system comprises a user interface layer 320 including the field explorer 302 and the canvas 304.

As mentioned above, in this mode of operation the canvas replaces the traditional transaction UI. The canvas symbolizes the stored document, and is the area on the screen where a user drops items (e.g. fields with a value).

As shown in FIG. 3A, the software layer 330 includes the interface engine 332. The interface engine serves to perform processing functions related to generation and maintenance of the user interface, and in particular to the functioning of the field explorer.

Specifically, the interface engine of the software layer is in communication with the database layer 340 of FIG. 3A. The database layer comprises a database 342 and a Table 1 344 that includes text fields 346.

The Field__1-Field__4 of the field explorer have a 1:1 relation 348 to the fields of the database. In certain embodiments, the input help function (e.g. F4 key) provides the allowed values.

The Text Input field 350 of the field explorer has a 1:n relation 352 to fields of the database. A value help function may provide allowed fields of the database.

According to certain embodiments, a generic input field may be employed on combination with the canvas feature to provide information for input. In such an embodiment a single generic input field may be accessed by the user, and provide a drop down menu of the various different types of input fields that are available to be input to the document by the user. Selection of the appropriate input field type will in turn allow the user to populate the canvas with relevant information as has been described above.

FIG. 3B shows the starting of the program providing the field explorer. In particular, the routine "Populate Value Helps" 360 is invoked. This method generates a value help icon (▼) 362 that is connected to a drop-down menu 364 presenting possible values 366 in the Table of F1_Values 368.

FIG. 3C shows the next step, wherein a user clicks on the value help icon and selects a particular value (here Value 3) from the resulting drop menu 370.

FIG. 3D shows the next step, wherein the user commits 372 the selected field to the database, utilizing the drag and drop field of the canvas. This action by the user triggers the following two (2) routines labeled 374 and 376 respectively:

"store_field_value_to_DB"

"move_field_to_list_end".

In particular, releasing the field on the canvas invokes the routine "store_field_value_to_DB", wherein the selected field is entered into the database field.

FIG. 3E shows the routine "move_field_to_list_end" that is invoked by dropping the field on the canvas. Pursuant to this routine, when the field is committed on the database, that field (e.g. Field__1) is moved to the bottom of the list in the field explorer, to indicate the commitment of the value of that field to the database.

Embodiments may offer various benefits. For example, by providing a field explorer that includes a list of available input fields, certain embodiments may ease the burden on the user to visually identify, navigate between, select, and enter data into, multiple fields of a complex document located in different regions within a traditional transactional UI. Moreover, as described above, some embodiments may further simplify the user interaction by dispensing with display of the traditional transactional UI entirely, replacing it with a symbolic representation of document container. Either embodiment of an interface may be particularly suited to work in conjunction with portable devices having small displays and cramped input environments (e.g. small keys, touch-screens).

Figure 4:
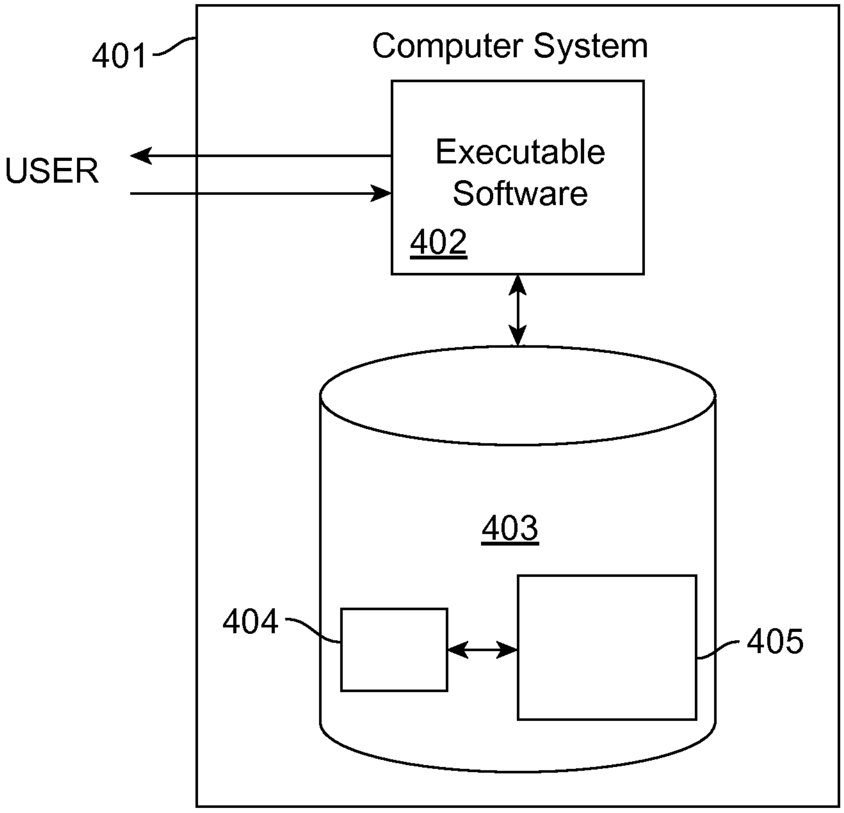
FIG. 4 illustrates hardware of a special purpose computing machine configured to provide a user interface according to one embodiment.

FIG. 4 illustrates hardware of a special purpose computing machine configured to provide a user interface comprising a field explorer according to an embodiment. In particular, computer system 401 comprises a processor 402 that is in electronic communication with a non-transitory computer-readable storage medium 403. This computer-readable storage medium has stored thereon code 405 corresponding to an interface engine. Code 404 corresponds to a database layer. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
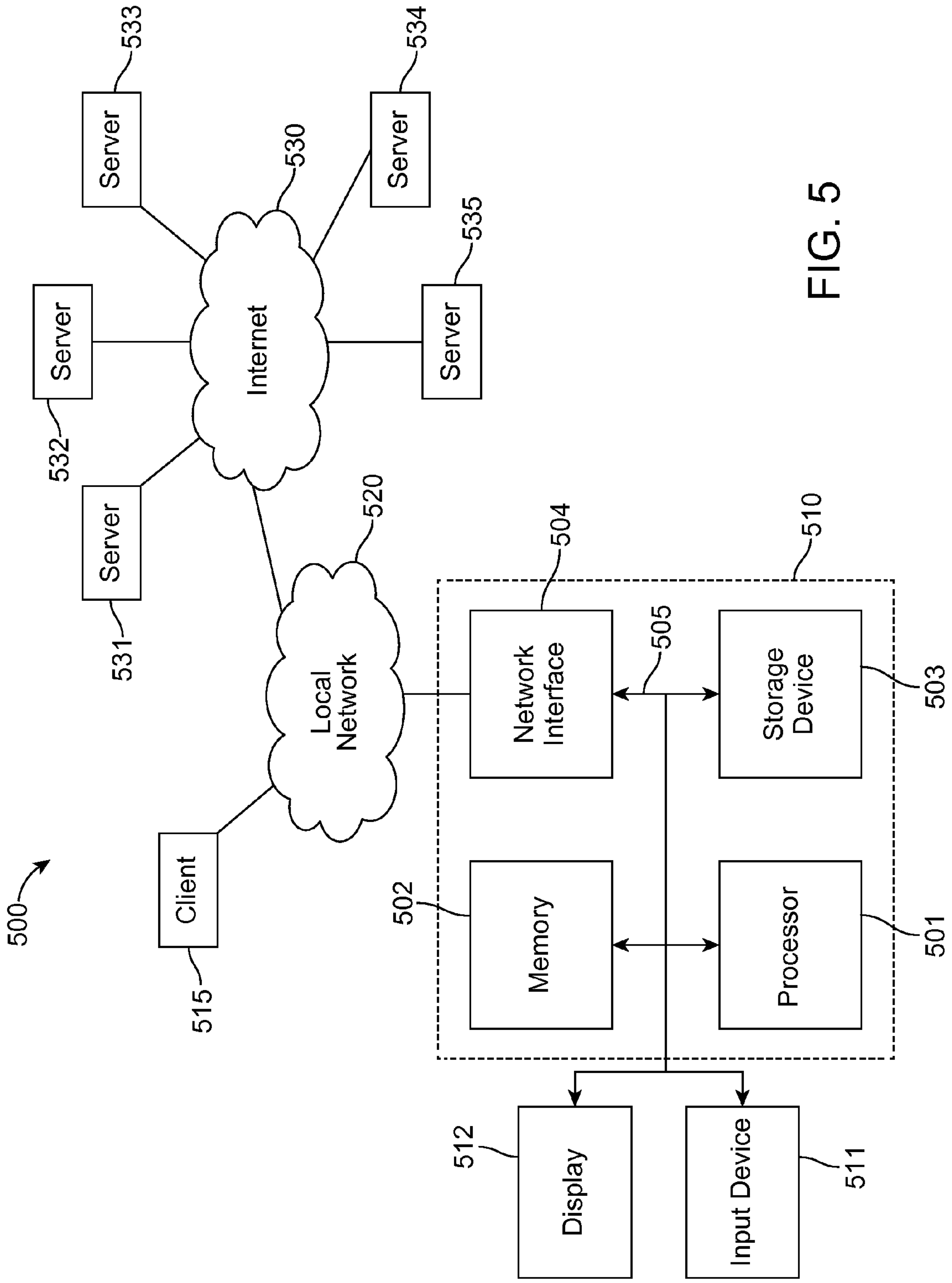
FIG. 5 illustrates an example of a computer system.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:

providing an interface engine in communication with a stored document comprising a plurality of available input fields;

causing the interface engine to display a list of the plurality of available input fields;

in response to a first input, causing the interface engine to display possible values for a first available input field; and in response to a second input, causing the interface engine to enter a value for the first available input field of the list of the plurality of available input fields into the stored document, the method further comprising causing the interface engine to move the first available input field of the list of the plurality of available input fields to an end of the list of the plurality of available input fields after the value has been entered into the stored document with only non-filled input fields remaining at the top of the list of the plurality of available input fields of the field explorer.

2. A method as in claim 1 wherein the interface engine displays a required input field of the list in a manner different from an optional input field.

3. A method as in claim 1 wherein:

the interface engine is configured to display with the list, a transaction user interface to the stored document; and the second input comprises dragging the value to the transaction user interface.

4. A method as in claim 1 wherein:

the user interface is configured to display with the list, a symbolic representation of the stored document; and the second input comprises dragging the value to the symbolic representation.

5. A method as in claim 1 wherein the stored document comprises a database including a table, and the list comprises columns of the table.

6. A method as in claim 1 wherein the interface engine is caused to display the list from a generic input field.

7. A non-transitory computer readable storage medium embodying a computer program for performing a method, said method comprising:

providing an interface engine in communication with a stored document comprising a plurality of available input fields;

causing the interface engine to display a list of the plurality of available input fields;

in response to a first input, causing the interface engine to display possible values for a first available input field; and in response to a second input, causing the interface engine to enter a value for the first available input field of the list of the plurality of available input fields into the stored document, wherein the method further comprises causing the interface engine to move the first available input field of the list of the plurality of available input fields to an end of the list of the plurality of available input fields after the value has been entered into the stored document with only non-filled input fields remaining at the top of the list of the plurality of available input fields of the field explorer.

8. A non-transitory computer readable storage medium as in claim 7 wherein the interface engine displays a required input field of the list in a manner different from an optional input field.

9. A non-transitory computer readable storage medium as in claim 7 wherein:

the interface engine is configured to display with the list, a transaction user interface to the stored document; and the second input comprises dragging the value to the transaction user interface.

10. A non-transitory computer readable storage medium as in claim 7 wherein:

the user interface is configured to display with the list, a symbolic representation of the stored document; and the second input comprises dragging the value to the symbolic representation further comprising.

11. A non-transitory computer readable storage medium as in claim 7 wherein the stored document comprises a database including a table, and the list comprises columns of the table.

12. A non-transitory computer readable storage medium as in claim 7 wherein the interface engine is caused to display the list from a generic input field.

13. A computer system comprising:

one or more processors;

a software program, executable on said computer system, the software program configured to:

provide an interface engine in communication with a stored document comprising a plurality of available input fields;

cause the interface engine to display a list of the plurality of available input fields;

in response to a first input, cause the interface engine to display possible values for a first available input field; and in response to a second input, cause the interface engine to enter a value for the first available input field of the list of the plurality of available input fields into the stored document, the software program further causing the interface engine to move the first available input field of the list of the plurality of available input fields to an end of the list of the plurality of available input fields after the value has been entered into the stored document with only non-filled input fields remaining at the top of the list of the plurality of available input fields of the field explorer.

14. A computer system as in claim 13 wherein the interface engine displays a required input field of the list in a manner different from an optional input field.

15. A computer system as in claim 13 wherein:

the interface engine is configured to display with the list, a transaction user interface to the stored document; and the second input comprises dragging the value to the transaction user interface.

16. A computer system as in claim 13 wherein:

the user interface is configured to display with the list, a symbolic representation of the stored document; and the second input comprises dragging the value to the symbolic representation.

17. A computer system as in claim 13 wherein the stored document comprises a database including a table, and the list comprises columns of the table.

* * * * *